United States Patent
Cong et al.

(10) Patent No.: US 11,946,120 B2
(45) Date of Patent: Apr. 2, 2024

(54) METHOD FOR CONTROLLING AMOUNT OF SILICON ADDED TO DUCTILE CAST IRON, METHOD FOR CASTING DUCTILE CAST IRON, AND CAST PRODUCT

(71) Applicants: TIANRUN INDUSTRY TECHNOLOGY CO., LTD., Weihai (CN); SHANDONG UNIVERSITY OF TECHNOLOGY, Zibo (CN)

(72) Inventors: Jianchen Cong, Weihai (CN); Shibo Shao, Weihai (CN); Haiming Yu, Weihai (CN); Xuezhong Dai, Weihai (CN); Peixiang Ni, Weihai (CN); Meizhen Feng, Weihai (CN); Shijie Lv, Weihai (CN); Hongri Cong, Weihai (CN)

(73) Assignees: TIANRUN INDUSTRY TECHNOLOGY CO., LTD., Shandong (CN); SHANDONG UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 17/642,572

(22) PCT Filed: Aug. 28, 2020

(86) PCT No.: PCT/CN2020/112243
§ 371 (c)(1),
(2) Date: Mar. 11, 2022

(87) PCT Pub. No.: WO2021/057386
PCT Pub. Date: Apr. 1, 2021

(65) Prior Publication Data
US 2022/0325390 A1  Oct. 13, 2022

(30) Foreign Application Priority Data
Sep. 26, 2019 (CN) .......... 201910916689.5

(51) Int. Cl.
| | | |
|---|---|---|
| *C22C 37/10* | (2006.01) | |
| *C21C 1/10* | (2006.01) | |
| *C21D 1/28* | (2006.01) | |
| *C21D 1/32* | (2006.01) | |
| *C21D 5/14* | (2006.01) | |
| *C22C 37/04* | (2006.01) | |

(52) U.S. Cl.
CPC .............. *C22C 37/10* (2013.01); *C21C 1/10* (2013.01); *C21D 1/28* (2013.01); *C21D 1/32* (2013.01); *C21D 5/14* (2013.01); *C22C 37/04* (2013.01); *C21D 2211/005* (2013.01); *C21D 2211/009* (2013.01)

(58) Field of Classification Search
CPC .................................. C21C 1/10; C21C 1/105
See application file for complete search history.

(56) References Cited

U.S. PATENT DOCUMENTS

2005/0103161 A1* 5/2005 Horie ................... C22C 33/08
75/571

FOREIGN PATENT DOCUMENTS

| | | | |
|---|---|---|---|
| CN | 101161845 | * | 4/2008 |
| CN | 102367537 | | 11/2013 |
| CN | 103556033 | * | 2/2014 |
| CN | 106636523 | * | 5/2017 |
| CN | 109402495 | | 3/2019 |
| CN | 110484676 | | 11/2019 |
| RU | 2618294 | * | 12/2015 |
| WO | 2011157840 | | 12/2011 |

OTHER PUBLICATIONS

Liu, S. "Recarburisers and graphitic inoculants for gray and ductile cast irons." University of Wisconsin. 1993. PhD dissertation. (Year: 1993).*
ISA; International Search Report and Written Opinion dated Apr. 1, 2021 in PCT/CN2020/112243.
CNIPA; First Search Report dated Nov. 12, 2020 in CN Application No. 201910916689.5.
CNIPA; Supplementary Search dated Jan. 27, 2021 in CN Application No. 201910916689.5.
PCT; International Preliminary Report on Patentability dated Mar. 29, 2022 in PCT/CN2020/112243.

\* cited by examiner

*Primary Examiner* — Nicholas A Wang
(74) *Attorney, Agent, or Firm* — SNELL & WILMER L.L.P.

(57) ABSTRACT

The present disclosure provides a method for controlling an amount of silicon added to ductile cast iron, a method for casting ductile cast iron, and a cast product, which relate to the technical fields of metallurgical and cast iron alloys. The method for controlling an amount of silicon added to ductile cast iron includes smelting ductile cast iron using scrap steel as a raw material. After the scrap steel is melted into molten iron, a copper alloy is added so that the molten iron has a copper equivalent of 0.8% to 1.0%, wherein the copper equivalent is controlled by formula (II). Then, ferrosilicon is added so that the content of silicon added to the molten iron satisfies formula (I).

11 Claims, No Drawings

METHOD FOR CONTROLLING AMOUNT OF SILICON ADDED TO DUCTILE CAST IRON, METHOD FOR CASTING DUCTILE CAST IRON, AND CAST PRODUCT

CROSS-REFERENCE TO RELATED APPLICATIONS

This application is a national stage application of PCT/CN2020/112243, filed on Aug. 28, 2020, entitled "Method for Controlling Amount of Silicon Added to Ductile Cast Iron, Method for Casting Ductile Cast Iron, and Cast Product." The PCT application claims priority to, and the benefit of, Chinese Patent Application No. CN201910916689.5, filed with the Chinese Patent Office on Sep. 26, 2019, entitled "Method for Controlling Amount of Silicon Added to Ductile Cast Iron, Method for Casting Ductile Cast Iron, and Cast Product". These applications are incorporated herein by reference in their entirety for all purposes.

TECHNICAL FIELD

The present disclosure relates to the technical field of metallurgy and cast iron alloys, and in particular to a method for controlling an amount of silicon added to ductile cast iron (also known as ductile iron, spheroidal graphite cast iron, or nodular cast iron), a method for casting ductile cast iron, and a cast product.

BACKGROUND ART

Ductile cast iron (referred simply to as ductile iron) has poor impact toughness, especially notched impact toughness. Prior art ductile cast iron is generally not required to have high impact toughness except for ferritic ductile iron. Even if it is necessary to test its impact energy, it is limited to testing the impact energy of unnotched test blocks. Ferritic ductile iron has low tensile strength, although it has high notched impact energy. For example, ductile iron of grade QT400-18R under Chinese Standard GB/T1348 has a notched impact energy ≥14 J at room temperature, but has a tensile strength of only above 400 MPa. For another example, pearlitic ductile iron QT900-2 with the currently highest strength has a notched impact energy of only 2 to 3 J at room temperature, although it can have a tensile strength of 900 MPa or more. Therefore, those mechanical parts required to have high strength and to withstand specific impact loads are basically made of forged steel and manufactured with high cost.

Connecting rods for internal combustion engines are required to have both high tensile strength and high impact toughness. However, a prior art technology for producing ductile cast iron results in either ductile iron with high tensile strength but low impact energy, or ductile iron with high impact energy but low tensile strength. It is difficult to balance the two properties.

Therefore, it is desirable to provide a process method for ductile cast iron, by which at least one of the above-mentioned problems can be solved.

SUMMARY

A first objective of the present disclosure is to provide a method for controlling an amount of silicon added to ductile cast iron, so that ductile cast iron can be imparted with both high tensile strength and high notched impact toughness.

A second objective of the present disclosure is to provide a method for casting ductile cast iron, to solve the problem of failing to impart both high tensile strength and high notched impact toughness to ductile cast iron.

A third objective of the present disclosure is to provide a cast product.

In order to achieve the above-mentioned objectives of the present disclosure, the following technical solutions are particularly employed:

In a first aspect, the present disclosure provides a method for controlling an amount of silicon added to ductile cast iron, comprising a step of:

smelting ductile cast iron using scrap steel as a raw material, wherein after the scrap steel is melted into molten iron, a copper alloy is first added so that the molten iron has a copper equivalent of 0.8% to 1.0%, and then ferrosilicon is added so that the content of silicon added to the molten iron satisfies the following formula (I):

$$Si_{added}=1.3CuE+10P+4S-Si_{original} \quad \text{formula (I)},$$

in formula (I), $Si_{added}$ is the content of silicon added to the molten iron, and CuE is the copper equivalent in the molten iron; P, S, and $Si_{original}$ are the phosphorus content, sulfur content, and silicon content in the molten iron before ferrosilicon is added, respectively;

wherein the copper equivalent is controlled by formula (II):

$$CuE=[W_{Cu}]_{newly\ added}+[(W_{Mn}-0.45\%)/2.5+1.1W_{Cr}+(W_{Mo}-0.15\%)/2+0.1W_{Ni}+12W_{Sn}+W_{Cu}+4W_{v}]_{original} \quad \text{formula (II)},$$

in formula (II), CuE is the copper equivalent, $[W_{Cu}]_{newly\ added}$ is the content of copper added to the molten iron, and $W_{Mn}$, $W_{Cr}$, $W_{Mo}$, $W_{Ni}$, $W_{Sn}$, $W_{Cu}$, and $W_{v}$ are the manganese content, chromium content, molybdenum content, nickel content, tin content, copper content, and vanadium content originally present in the molten iron, respectively.

In a second aspect, the present disclosure provides a method for casting ductile cast iron, comprising: regulating the silicon content by using the method for controlling an amount of silicon added to ductile cast iron described above.

In a third aspect, the present disclosure provides a cast product, which is cast by using the method for casting ductile cast iron described above.

The present disclosure has the following advantageous effects compared with the prior art.

In the present disclosure, in view of the presence of many miscellaneous elements in molten iron in the process of smelting ductile cast iron using scrap steel as a raw material, a concept of copper equivalent is introduced, the elements such as manganese, chromium, molybdenum, nickel, and vanadium are converted into the copper equivalent, and the copper equivalent is controlled at 0.8% to 1.0%, so that high tensile strength and elongation can be stably achieved. Moreover, the silicon content in the molten iron is dynamically regulated according to the copper equivalent and the phosphorus and sulfur content, so that tensile strength and impact energy can be optimized simultaneously.

The pearlitic ductile cast iron obtained by using the method for controlling an amount of silicon added, according to the present disclosure, and the casting method according to the present disclosure can have a tensile strength of 900 MPa or more and a notched impact energy of 7 J or more at room temperature, which are much superior to the properties of pearlitic ductile cast iron of the highest grade QT900-2 as prescribed in Chinese Standard GB/T1348. Especially, the ductile cast iron according to the present disclosure is outstandingly characterized by high notched impact toughness and therefore can be used in production of connecting rods.

DETAILED DESCRIPTION OF EMBODIMENTS

The technical solutions of the present disclosure will be described below clearly and completely in connection with examples. It is apparent that the examples to be described are some, but not all of the examples of the present disclosure. All the other examples obtained by those of ordinary skill in the art in light of the examples of the present disclosure without inventive efforts will fall within the scope of the present disclosure as claimed.

Although the high-performance ductile iron produced in the prior art also has a matrix structure containing not more than 10% of ferrite and has a tensile strength of 900 MPa or more, it has a notched impact energy of only 2 to 3 J at room temperature. It is often difficult to balance both the tensile strength and impact energy performance.

The present disclosure provides a method for controlling an amount of silicon added to ductile cast iron, in order to impart cast iron with both high tensile strength and high notched impact toughness. The method comprises a step of:

smelting ductile cast iron using scrap steel as a raw material. The sources of scrap steel include, but are not limited to, leftovers from the manufacture of stamped parts, such as leftovers from the manufacture of stamped parts of automobile. Scrap steel may be carbon steel, alloy steel, or a mixture of them. The heredity effect resulting from the use of pig iron as a raw material can be avoided by using scrap steel as a raw material.

After the scrap steel is melted into molten iron, a copper alloy is first added so that the molten iron has a copper equivalent of 0.8% to 1.0%, wherein the copper equivalent is controlled according to a mathematical model represented by the following formula:

$$CuE=[W_{Cu}]_{newly\ added}+[(W_{Mn}-0.45\%)/2.5+1.1W_{Cr}+(W_{Mo}-0.15\%)/2+0.1W_{Ni}+12W_{Sn}+W_{Cu}+4W_{v}]_{original},$$

where CuE is the copper equivalent, $[W_{Cu}]_{newly\ added}$ is the copper content (wt %) added to the molten iron, and $W_{Mn}$, $W_{Cr}$, $W_{Mo}$, $W_{Ni}$, $W_{Sn}$, $W_{Cu}$, and $W_v$ are the manganese content (wt %), chromium content (wt %), molybdenum content (wt %), nickel content (wt %), tin content (wt %), copper content (wt %), and vanadium content (wt %) originally present in the molten iron, respectively.

A sample is taken from molten iron immediately after the scrap steel is melted into molten iron, to analyze the content (wt %) of each of alloying elements, i.e., copper, manganese, chromium, molybdenum, nickel, vanadium, and tin, that are already present in the molten iron. The analysis may be performed by using a conventional method for analysis of the chemical composition of molten iron. For example, a spectrometer in front of furnace can quickly analyze the content of each of alloying elements in the molten iron, mainly the content of each of Mn, Cr, Mo, Ni, Sn, Cu, V, and the like. Then, the content of copper added is calculated according to the above mathematical model for control of the copper equivalent and converted into an amount of a copper alloy added to the molten iron, so that the molten iron has a copper equivalent of 0.8% to 1.0%. For example, the copper equivalent is 0.8%, 0.85%, 0.9%, 0.95%, or 1.0%.

The mathematical model can be specifically understood with reference to Chinese Patent Publication No. CN103556033A, and will not be described in detail here.

Then, ferrosilicon is added so that the content of silicon added to the molten iron satisfies the following formula (I):

$$Si_{added}=1.3CuE+10P+4S-Si_{original},$$ where $Si_{added}$ is the silicon content (wt %) added to the molten iron, and CuE is the copper equivalent (%) in the molten iron; P, S, and $Si_{original}$ are the phosphorus content (wt %), sulfur content (wt %), and silicon content (wt %) in the molten iron before ferrosilicon is added, respectively.

Before ferrosilicon is added, the content (wt %) of each of phosphorus, sulfur, and silicon already present in the molten iron is analyzed, and then the content of silicon to be increased (added) is calculated in accordance with the above formula and converted into a weight of ferrosilicon added to the molten iron, so as to achieve the purpose of adjusting the silicon content.

The weight of ferrosilicon is converted from the silicon content $Si_{added}$ added to the molten iron by the following relationship.

The weight of ferrosilicon added is calculated by: $Si_{added}$/silicon content in ferrosilicon×the weight of molten iron.

The use of scrap steel as a raw material allows for taking advantage of its low heredity, but scrap steel (such as leftovers from the manufacture of stamped parts of automobile) contains many miscellaneous alloying elements, unlike pig iron characterized by substantially not containing an alloying element. The elements such as copper, manganese, chromium, molybdenum, nickel, and vanadium all increase the pearlite content in cast iron, thereby resulting in an increased tensile strength and reduced impact toughness of cast iron. In contrast, silicon reduces the pearlite content, thereby reducing tensile strength and increasing impact toughness. Moreover, the impact toughness is severely reduced by phosphorus and sulfur in the molten iron. In the prior art silicon increasing process, ferrosilicon is directly added to the molten iron according to a set silicon content, and the silicon content in the molten iron is fixed. However, tensile strength and impact energy cannot be optimized simultaneously by adding a fixed amount of silicon, due to a certain fluctuation of the content of copper, manganese, chromium, molybdenum, nickel, vanadium, tin, phosphorus, and sulfur in molten iron in each furnace. Therefore, in order to impart cast iron with both high tensile strength and high notched impact toughness, a concept of copper equivalent is introduced in the present disclosure, the elements such as manganese, chromium, molybdenum, nickel, and vanadium are converted into the copper equivalent, and the copper equivalent is controlled at 0.8% to 1.0%, so that high tensile strength and elongation can be stably achieved. Moreover, the silicon content in the molten iron is dynamically regulated according to the copper equivalent and the phosphorus and sulfur content, so that tensile strength and impact energy can be optimized simultaneously.

In some preferred embodiments, a mixture of microcrystalline graphite powder and silicon carbide crystal is added while the scrap steel is being melted into molten iron.

In some preferred embodiments, the mixture of microcrystalline graphite powder and silicon carbide crystal is added in an amount of 4% to 6%, including, for example, but not limited to 5%, based on the weight of the molten iron.

The mixture of microcrystalline graphite powder and silicon carbide crystal is added for the purpose of reacting silicon carbide with iron in the molten iron to produce iron silicide and carbon. The silicon carbide will be continuously melted before the reaction is terminated to facilitate a rise in nucleating temperature and increase non-spontaneous nucleation, so that the eutectic molten iron mixture has a cooling curve shifted upward, and the precipitation of graphite is facilitated.

In some preferred embodiments, the copper alloy is added within 10 to 15 minutes after the mixture of microcrystalline graphite powder and silicon carbide crystal is added, so that the molten iron has a copper equivalent of 0.8% to 1.0%.

High tensile strength and high elongation of ductile cast iron are advantageously achieved by adding the copper alloy in time to maintain a certain copper equivalent.

In some preferred embodiments, the method for controlling an amount of silicon added further comprises a step of: heating the molten iron to 1400° C. to 1450° C. (preferably 1420° C. to 1440° C.) and examining the chemical composition of the molten iron and then adding the ferrosilicon, after adding the copper alloy so that the molten iron has a copper equivalent of 0.8% to 1.0%.

According to a second aspect of the present disclosure, a method for casting ductile cast iron is provided, which comprises: regulating the silicon content by using the method for controlling an amount of silicon added to ductile cast iron described above.

This casting method and the method for controlling an amount of silicon added to ductile cast iron described above are based on the same inventive concept and can achieve the same effects.

In some preferred embodiments, the casting method further comprises a step of: performing spheroidization and cast molding after regulating the silicon content by using the method for controlling an amount of silicon added to ductile cast iron.

The spheroidization and the cast molding are not limited and may be carried out in a conventional manner.

Preferably, the spheroidization may be performed at a temperature of, for example, 1500° C., 1510° C., 1520° C., 1530° C., or 1540° C., and the spheroidization may be maintained at the temperature for, for example, 3 min, 4 min, or 5 min.

In some preferred embodiments, the casting method further comprises a step of performing normalizing and tempering treatments after the cast molding, to obtain a mixed matrix structure of pearlite and blocky ferrite.

The normalizing and tempering treatments are not limited and may be carried out in a conventional manner.

Preferably, the ferrite content is not more than 10%.

In some preferred embodiments, a typical method for casting ductile cast iron comprises the steps of:

(a) providing raw materials, wherein leftovers from the manufacture of stamped parts of automobile are used as the raw materials from which ductile cast iron is smelted;

(b) adding the leftovers from the manufacture of stamped parts of automobile and a mixture of microcrystalline graphite powder and silicon carbide crystal into an electric furnace and heating and melting the mixed materials, wherein the mixture of microcrystalline graphite powder and silicon carbide crystal is added in an amount of 4% to 6% based on the weight of the molten iron;

(c) adding a copper alloy within 10 to 15 minutes after adding the mixture of microcrystalline graphite powder and silicon carbide crystal so that the molten iron has a copper equivalent of 0.8% to 1.0%, and then calculating the content of silicon added according to a formula for control of the amount of silicon added, and subsequently converting the silicon content into a weight of ferrosilicon and adding ferrosilicon to the molten iron;

wherein the amount of silicon added is controlled by the formula: $Si_{added}=1.3CuE+10P+4S-Si_{original}$, in the formula, $Si_{added}$ is the content of silicon added to the molten iron;

CuE is the copper equivalent in the molten iron;

P, S, and $Si_{original}$ represent the contents before ferrosilicon is added;

(d) continuing to heat the molten iron to 1500° C. and maintaining the molten iron at the temperature for 3 to 5 minutes, then spheroidizing the molten iron, and then casting a cast product from the molten iron; and (e) normalizing and tempering the cast product to obtain a mixed matrix structure of pearlite and blocky ferrite which contains not more than 10% of ferrite.

Although the high-performance ductile iron produced in the prior art also has a matrix structure containing not more than 10% of ferrite and has a tensile strength of 900 MPa or more, it has a notched impact energy of only 2 to 3 J at room temperature. The ductile iron produced by the process of the present disclosure not only has a tensile strength of 900 MPa or more, but also has an impact energy of 7 J or more at room temperature.

According to a third aspect of the present disclosure, a cast product is provided, which is cast by using the method for casting ductile cast iron described above.

Preferably, the cast product is a cast connecting rod for an internal combustion engine.

Compared with the prior art, a cast body cast from ductile iron by the method of the present disclosure has a tensile strength ≥900 MPa, an elongation ≥7%, and a notched impact energy ≥7J at room temperature, which are much superior to the properties of pearlitic ductile cast iron of the highest grade QT900-2 as prescribed in Chinese Standard GB/T1348, and is especially outstandingly characterized by high notched impact toughness.

The present disclosure will be further described below in connection with examples and comparative examples.

EXAMPLE 1

A method of making ductile cast iron for connecting rods with high tensile strength and high notched impact toughness comprises the steps of:

melting leftovers from the manufacture of stamped parts of automobile as raw materials in a 7.5-ton electric furnace. A mixture of microcrystalline graphite powder and silicon carbide crystal is added during melting to facilitate the precipitation of carbon in the form of graphite and to increase silicon. Then, the mixed materials are subjected to alloying, spheroidization, and cast molding. The cast-molded connecting rod blank is subjected to secondary isothermal normalizing and tempering treatments.

In this example, leftovers from the manufacture of stamped parts of automobile are used as raw materials, and a burdening list is compiled and input into an automatic burdening and weighing system for automatic weighing.

7 tons of leftovers from the manufacture of stamped parts of automobile are added to the electric furnace, and then 350 kilograms of a mixture of microcrystalline graphite powder and silicon carbide crystal are added, and melting of the mixed materials is started.

A copper alloy is added so that molten iron has a copper equivalent of 0.9%. This step specifically includes:
taking a sample from molten iron into which the mixed materials are melted and analyzing the content (wt %) of each of alloying elements originally present in the molten iron (i.e., Mn 0.862, Cr 0.253, Mo 0.205, Ni 0.063, Sn 0.00203, Cu 0.0281, V 0.0362), and detecting the phosphorus content (0.05%), sulfur content (0.02%), and silicon content (1.3%) in the molten iron. A copper equivalent is set at 0.9%, and the content of copper added to the molten iron is calculated according to the following formula for control of the copper equivalent:

$$[W_{Cu}]_{newly\ added} = 0.9\% - [(W_{Mn} - 0.45\%)/2.5 + 1.1 W_{Cr} + (W_{Mo} - 0.15\%)/2 + 0.1 W_{Ni} + 12 W_{Sn} + W_{Cu} + 4 W_v]_{original} = 0.326\%.$$

The amount of copper added is converted into an amount of a copper alloy added by the formula: 7350×0.326%=24.0 kg.

Then, the content of silicon added is calculated according to the following formula for control of an amount of silicon added, and then ferrosilicon is added to the molten iron.

$$Si_{added} = 1.3 CuE + 10P + 4S - Si_{original} = 1.3 \times 0.9\% + 10 \times 0.05\% + 4 \times 0.02\% - 1.3\% = 0.45\%$$

Ferrosilicon 75 contains 75% of silicon, thus ferrosilicon is added in an amount of 0.45%/0.75×7350 kg=44 kg.

The molten iron is continued to be heated to 1500° C. and left to stand at the high temperature for 4 min. When the molten iron is cooled to 1400° C., secondary deslagging is performed, and then the molten iron is quantitatively discharged into a transfer ladle.

The transfer ladle is transferred to a spheroidization station where the molten iron is poured into a teapot-type sealed spheroidizing pouring ladle for spheroidization; and the molten iron which has been spheroidized is deslagged again and then covered with a thermal insulation material and transferred to a casting station where the molten iron is poured into a casting mold to form an as-cast blank.

The as-cast blank is normalized and tempered to obtain a mixed matrix structure of pearlite and blocky ferrite, in which the ferrite contains not more than 10%.

EXAMPLE 2

A method of making ductile cast iron for connecting rods with high tensile strength and high notched impact toughness comprises the following steps.

(1) Leftovers from the manufacture of stamped parts of automobile are used as raw materials, and a burdening list is compiled and input into an automatic burdening and weighing system for automatic weighing.

7 tons of leftovers from the manufacture of stamped parts of automobile are added to the electric furnace, and then 350 kilograms of a mixture of microcrystalline graphite powder and silicon carbide crystal are added, and melting of the mixed materials is started.

(2) A copper alloy is added so that molten iron has a copper equivalent of 0.8%. This step specifically includes:
taking a sample from molten iron into which the mixed materials are melted and analyzing the content (wt %) of each of alloying elements originally present in the molten iron (i.e., Mn 0.63, Cr 0.162, Mo 0.092, Ni 0.037, Sn 0.0018, Cu 0.036, V 0.0078), and detecting the phosphorus content (0.032%), sulfur content (0.015%), and silicon content (1.08%) in the molten iron. A copper equivalent is set at 0.8%, and the content of copper added to the molten iron is calculated according to the following formula for control of the copper equivalent:

$$[W_{Cu}]_{newly\ added} = 0.8\% - [(W_{Mn} - 0.45\%)/2.5 + 1.1 W_{Cr} + (W_{Mo} - 0.15\%)/2 + 0.1 W_{Ni} + 12 W_{Sn} + W_{Cu} + 4 W_v]_{original} = 0.487\%.$$

The amount of copper added is converted into an amount of a copper alloy added by the formula: 7350×0.487%=35.8 kg.

Then, the content of silicon added is calculated according to the following formula for control of an amount of silicon added, and then ferrosilicon is added to the molten iron.

$$Si_{added} = 1.3 CuE + 10P + 4S - Si_{original} = 1.3 \times 0.8\% + 10 \times 0.032\% + 4 \times 0.015\% - 1.08\% = 0.34\%$$

Ferrosilicon 75 contains 75% of silicon, thus ferrosilicon is added in an amount of 0.34%/0.75×7350 kg=33 kg.

(3) The molten iron is continued to be heated to 1500° C. and left to stand at the high temperature for 4 min. When the molten iron is cooled to 1400° C., secondary deslagging is performed, and then the molten iron is quantitatively discharged into a transfer ladle.

The transfer ladle is transferred to a spheroidization station where the molten iron is poured into a teapot-type sealed spheroidizing pouring ladle for spheroidization; and the molten iron which has been spheroidized is deslagged again and then covered with a thermal insulation material and transferred to a casting station where the molten iron is poured into a casting mold to form an as-cast blank.

(5) The as-cast blank is normalized and tempered to obtain a mixed matrix structure of pearlite and blocky ferrite, in which the ferrite contains not more than 10%.

EXAMPLE 3

A method of making ductile cast iron for connecting rods with high tensile strength and high notched impact toughness comprises the following steps.

(1) Leftovers from the manufacture of stamped parts of automobile are used as raw materials, and a burdening list is compiled and input into an automatic burdening and weighing system for automatic weighing.

7 tons of leftovers from the manufacture of stamped parts of automobile are added to the electric furnace, and then 350 kilograms of a mixture of microcrystalline graphite powder and silicon carbide crystal are added, and melting of the mixed materials is started.

(2) A copper alloy is added so that molten iron has a copper equivalent of 1.0%. This step specifically includes:
taking a sample from molten iron into which the mixed materials are melted and analyzing the content (wt %) of each of alloying elements originally present in the molten iron (i.e., Mn 0.52, Cr 0.225, Mo 0.165, Ni 0.032, Sn 0.00187, Cu 0.026, V 0.018), and detecting the phosphorus content (0.035%), sulfur content (0.011%), and silicon content (1.12%) in the molten iron. A copper equivalent is set at 1.0%, and the content of copper added to the molten iron is calculated according to the following formula for control of the copper equivalent:

$$[W_{Cu}]_{newly\ added} = 1.0\% - [(W_{Mn} - 0.45\%)/2.5 + 1.1 W_{Cr} + (W_{Mo} - 0.15\%)/2 + 0.1 W_{Ni} + 12 W_{Sn} + W_{Cu} + 4 W_v]_{original} = 0.583\%.$$

The amount of copper added is converted into an amount of a copper alloy added by the formula: 7350×0.583%=42.9 kg.

Then, the content of silicon added is calculated according to the following formula for control of an amount of silicon added, and then ferrosilicon is added to the molten iron.

$$Si_{added}=1.3CuE+10P+4S-Si_{original}=1.3\times1.0\%+10\times 0.035\%+4\times0.011\%-1.12\%=0.57\%$$

Ferrosilicon 75 contains 75% of silicon, thus ferrosilicon is added in an amount of 0.57%/0.75×7350 kg=56 kg.

(3) The molten iron is continued to be heated to 1500° C. and left to stand at the high temperature for 4 min. When the molten iron is cooled to 1400° C., secondary deslagging is performed, and then the molten iron is quantitatively discharged into a transfer ladle.

The transfer ladle is transferred to a spheroidization station where the molten iron is poured into a teapot-type sealed spheroidizing pouring ladle for spheroidization; and the molten iron which has been spheroidized is deslagged again and then covered with a thermal insulation material and transferred to a casting station where the molten iron is poured into a casting mold to form an as-cast blank.

(5) The as-cast blank is normalized and tempered to obtain a mixed matrix structure of pearlite and blocky ferrite, in which the ferrite contains not more than 10%.

COMPARATIVE EXAMPLE 1

In the comparative example, high-performance ductile cast iron was produced according to prior conventional technology. In other words, pig iron, carbon steel scrap, and foundry returns were used as raw materials, and ferrosilicon was added for inoculation treatment during melting of the raw materials. The silicon content was controlled at about 2.5% in order to obtain higher impact toughness. Then, the raw materials were subjected to alloying, spheroidization, and cast molding, and the cast-molded connecting rod blank was normalized and tempered.

This comparative example was different from Example 1 mainly in that pig iron, carbon steel scrap, and foundry returns were used as raw materials and silicon was added in an amount according to a fixed index in this comparative example, while leftovers from the manufacture of stamped parts of automobile were used as raw materials and silicon was added in an amount calculated by a formula for control of the amount of silicon added in Example 1.

In this comparative example, pig iron, carbon steel scrap, and foundry returns were used as raw materials. The raw materials were specifically mixed in a ratio of 50% pig iron+30% carbon steel scrap+20% foundry returns. A dispensing list was compiled and input into an automatic dispensing and weighing system for automatic weighing. A total of 7 tons of raw materials were added to an electric furnace and started to be melted.

240 kilograms of ferrosilicon 75 were added during melting of the raw materials into molten iron. Ferrosilicon 75 contained 75% of silicon, thus silicon was contained in the molten iron in an amount of 240×75%/7240=2.5%.

After the raw materials were melted into the molten iron, a copper alloy was added so that the molten iron had a copper equivalent of 0.9%.

The molten iron was continued to be heated to 1500° C. and left to stand at the high temperature for 4 min. When the molten iron was cooled to 1400° C., secondary deslagging was performed, and then the molten iron was quantitatively discharged into a transfer ladle.

The transfer ladle was transferred to a spheroidization station where the molten iron was poured into a teapot-type sealed spheroidizing pouring ladle for spheroidization; and the molten iron which was spheroidized was deslagged again and then covered with a thermal insulation material and transferred to a casting station where the molten iron was poured into a casting mold to form an as-cast blank.

The as-cast blank was normalized and tempered to have a ferrite content of 25%.

COMPARATIVE EXAMPLE 2

In the comparative example, high-performance ductile cast iron was produced according to prior conventional technology. In other words, pig iron, carbon steel scrap, and foundry returns were used as raw materials, and ferrosilicon was added for inoculation treatment during melting of the raw materials. The silicon content was controlled at about 1.8% in order to obtain higher tensile strength. Then, the raw materials were subjected to alloying, spheroidization, and cast molding, and the cast-molded connecting rod blank was normalized and tempered.

In this comparative example, leftovers from the manufacture of stamped parts of automobile were used as raw materials. A burdening list was compiled and input into an automatic burdening and weighing system for automatic weighing. A total of 7 tons of raw materials were added to an electric furnace and started to be melted.

172 kilograms of ferrosilicon 75 were added during melting of the raw materials into molten iron. Ferrosilicon 75 contained 75% of silicon, thus silicon was contained in the molten iron in an amount of 172×75%/7172=1.8%.

After the raw materials were melted into the molten iron, a copper alloy was added so that the molten iron had a copper equivalent of 0.9%.

The molten iron was continued to be heated to 1500° C. and left to stand at the high temperature for 4 min. When the molten iron was cooled to 1400° C., secondary deslagging was performed, and then the molten iron was quantitatively discharged into a transfer ladle.

The transfer ladle was transferred to a spheroidization station where the molten iron was poured into a teapot-type sealed spheroidizing pouring ladle for spheroidization; and the molten iron which was spheroidized was deslagged again and then covered with a thermal insulation material and transferred to a casting station where the molten iron was poured into a casting mold to form an as-cast blank.

The as-cast blank was normalized and tempered to obtain a mixed matrix structure of pearlite and blocky ferrite which contained 5% of ferrite.

The properties of the connecting rod bodies obtained from ductile cast iron in the above examples and comparative examples and the properties of a connecting rod body made from forged steel C70S6 were compared as shown in Table 1.

The respective indexes were tested by the following methods. Tensile test samples, impact test samples, and hardness test blocks were all taken from the connecting rod bodies.

Tensile strength, yield strength, and elongation were detected in accordance with GB/T228 "Method for Tensile Test of Metallic Materials at Room Temperature". Impact energy was detected in accordance with GB/T229 "Method for Charpy Pendulum Impact Test of Metallic Materials". Hardness was detected in accordance with GB/T "Test Method in Part 1 of Brinell Hardness Test of Metallic Materials".

TABLE 1

Table of Comparison of the Properties of Connecting Rod Bodies made in the Examples and Comparative Examples and made from Forged Steel C70S6

| No. | Tensile Strength/ MPa | Yield Strength/ MPa | Elongation (%) | Impact Energy (J) | Hardness HBW |
|---|---|---|---|---|---|
| Example 1 | 927 | 625 | 8 | 7.6 | 288 |
| Example 2 | 939 | 636 | 7.8 | 7.5 | 292 |
| Example 3 | 936 | 613 | 8.2 | 7.3 | 290 |
| Comparative Example 1 | 716 | 402 | 6.3 | 7.5 | 262 |
| Comparative Example 2 | 931 | 582 | 4.5 | 2.4 | 292 |
| C70S6 | 900-1050 | 550-650 | 10-15 | 6-8 | 250-310 |

Note:
the impact test blocks had V-notches.

It can be seen from Table 1 that the connecting rod bodies obtained from ductile cast iron by the casting method of the present disclosure can not only have a tensile strength of more than 900 MPa and an elongation of more than 7%, but also have a notched impact energy of more than 7 J at room temperature.

The ductile cast iron produced by the ductile cast iron casting method of the present disclosure has comparable properties and allows the weight of a part made therefrom to be reduced by 8% or more, as compared to the material C70S6 which is currently the most widely used in connecting rods. Moreover, the traditional connecting rods made of forged steel have a weight fluctuation of up to 3% to 5%, whereas the connecting rods cast by the manufacturing process of the present disclosure have a weight fluctuating only in a range of 1% to 2% and therefore need not to be grouped in use, whereby the difficulty in production is reduced.

The ductile cast iron in the examples of the present disclosure is produced by simple process steps and produced at a cost lower than that of a connecting rod of steel C70S6 by 30% or more, and therefore is a good material for manufacturing connecting rods.

Finally, it should be noted that the above embodiments are merely intended to illustrate the technical solutions of the present disclosure, but not intended to limit the present disclosure. Although the present disclosure has been described in detail with reference to the foregoing embodiments, it should be understood by those of ordinary skill in the art that the technical solutions disclosed in the foregoing embodiments may still be modified, or some or all of the technical features thereof may be replaced with equivalents. Such modifications or replacements will not cause the essence of the corresponding technical solutions to depart from the scope of the technical solutions of the embodiments of the present disclosure.

What is claimed is:

1. A method for controlling an amount of silicon added to ductile cast iron, comprising:
    smelting ductile cast iron using scrap steel as a raw material, wherein after the scrap steel is melted into molten iron, a copper alloy is first added so that the molten iron has a copper equivalent of 0.8% to 1.0%, and then ferrosilicon is added so that a content of silicon added to the molten iron satisfies a following formula (I):

$$Si_{added} = 1.3CuE + 10P + 4S - Si_{original} \quad \text{formula (I)},$$

in formula (I), $Si_{added}$ is the content of silicon added to the molten iron, and CuE is the copper equivalent in the molten iron; and P, S, and $Si_{original}$ are a phosphorus content, a sulfur content, and a silicon content in the molten iron before the ferrosilicon is added, respectively;

wherein the copper equivalent is controlled by formula (II):

$$CuE = [W_{Cu}]_{newly\ added} + [(W_{Mn} - 0.45\%)/2.5 + 1.1W_{Cr} + (W_{Mo} - 0.15\%)/2 + 0.1W_{Ni} + 12W_{Sn} + W_{Cu} + 4W_{V}]_{original} \quad \text{formula (II)},$$

in formula (II), CuE is the copper equivalent, $[W_{Cu}]_{newly\ added}$ is a content of copper added to the molten iron, and $W_{Mn}$, $W_{Cr}$, $W_{Mo}$, $W_{Ni}$, $W_{Sn}$, $W_{Cu}$, and $W_{v}$ are a manganese content, a chromium content, a molybdenum content, a nickel content, a tin content, a copper content, and a vanadium content originally present in the molten iron, respectively, wherein a mixture of microcrystalline graphite powder and silicon carbide crystal is added in duration that scrap steel is being melted into the molten iron, and wherein the mixture of microcrystalline graphite powder and silicon carbide crystal is added in an amount of 4% to 6% of the molten iron in weight.

2. The method for controlling an amount of silicon added to ductile cast iron according to claim 1, further comprising heating, after adding the copper alloy so that the molten iron has the copper equivalent of 0.8% to 1.0%, the molten iron to 1400° C. to 1450° C., examining a chemical composition of the molten iron and then adding the ferrosilicon.

3. The method for controlling an amount of silicon added to ductile cast iron according to claim 1, wherein the scrap steel is obtained from leftovers from a manufacture of stamped parts.

4. The method for controlling an amount of silicon added to ductile cast iron according to claim 3, wherein the scrap steel is obtained from leftovers from a manufacture of stamped parts of an automobile.

5. The method for controlling an amount of silicon added to ductile cast iron according to claim 1, wherein the copper alloy is added within 10 to 15 minutes after the mixture of microcrystalline graphite powder and silicon carbide crystal is added, so that the molten iron has the copper equivalent of 0.8% to 1.0%.

6. A method for casting ductile cast iron, comprising: regulating the silicon content by using the method for controlling an amount of silicon added to ductile cast iron according to claim 1.

7. The method for casting ductile cast iron according to claim 6, further comprising a step of: performing spheroidization and cast molding after regulating the silicon content by using the method for controlling an amount of silicon added to ductile cast iron.

8. The method for casting ductile cast iron according to claim 7, wherein the spheroidization is performed at a temperature of 1500° C. to 1540° C., and the spheroidization is maintained at the temperature for 3 to 5 min.

9. The method for casting ductile cast iron according to claim 7, further comprising performing normalizing and tempering treatments after the cast molding, so as to obtain a mixed matrix structure of pearlite and blocky ferrite.

10. The method for casting ductile cast iron according to claim 9, wherein the ferrite content is not more than 10%.

11. A method for controlling an amount of silicon added to ductile cast iron, comprising:

smelting ductile cast iron using scrap steel as a raw material, wherein after the scrap steel is melted into molten iron, a copper alloy is first added so that the molten iron has a copper equivalent of 0.8% to 1.0%, and then ferrosilicon is added so that a content of silicon added to the molten iron satisfies a following formula (I):

$$Si_{added}=1.3CuE+10P+4S-Si_{original} \quad \text{formula (I)},$$

in formula I, $Si_{added}$ is the content of silicon added to the molten iron, and CuE is the copper equivalent in the molten iron; and P, S, and $Si_{original}$ are a phosphorus content, a sulfur content, and a silicon content in the molten iron before the ferrosilicon is added, respectively;

wherein the copper equivalent is controlled by formula (II):

$$CuE=[W_{Cu}]_{newly\ added}+[(W_{Mn}-0.45\%)/2.5+1.1W_{Cr}+(W_{Mo}-0.15\%)/2+0.1W_{Ni}+12W_{Sn}+W_{Cu}+4W_{v}]_{original} \quad \text{formula (II)},$$

in formula (II) CuE is the copper equivalent, $[W_{Cu}]_{newly\ added}$ is a content of copper added to the molten iron, and $W_{Mn}$, $W_{Cr}$, $W_{Mo}$, $W_{Ni}$, $W_{Sn}$, $W_{Cu}$, and $W_{v}$ are a manganese content, a chromium content, a molybdenum content, a nickel content, a tin content, a copper content, and a vanadium content originally present in the molten iron, respectively, wherein a mixture of microcrystalline graphite powder and silicon carbide crystal is added in duration that scrap steel is being melted into the molten iron, and wherein the copper alloy is added within 10 to 15 minutes after the mixture of microcrystalline graphite powder and silicon carbide crystal is added, so that the molten iron has the copper equivalent of 0.8% to 1.0%.

* * * * *